(12) United States Patent
McGrade

(10) Patent No.: US 11,154,046 B2
(45) Date of Patent: Oct. 26, 2021

(54) VERTICAL TRAP

(71) Applicant: Michael McGrade, West Covina, CA (US)

(72) Inventor: Michael McGrade, West Covina, CA (US)

( * ) Notice: Subject to any disclaimer, the term of this patent is extended or adjusted under 35 U.S.C. 154(b) by 352 days.

(21) Appl. No.: 16/511,336

(22) Filed: Jul. 15, 2019

(65) Prior Publication Data
US 2021/0015088 A1   Jan. 21, 2021

(51) Int. Cl.
*A01M 23/30* (2006.01)
*A01M 23/24* (2006.01)

(52) U.S. Cl.
CPC .......... *A01M 23/30* (2013.01); *A01M 23/245* (2013.01)

(58) Field of Classification Search
CPC ..... A01M 23/24; A01M 23/30; A01M 24/245
USPC .............................................................. 43/82
See application file for complete search history.

(56) References Cited

U.S. PATENT DOCUMENTS

| | | | | |
|---|---|---|---|---|
| 400,324 A * | 3/1889 | Gilmore | ................. | A01M 23/24 43/86 |
| 575,792 A * | 1/1897 | Sullivan | ................. | A01M 23/24 43/85 |
| 600,156 A * | 3/1898 | Mast | ....................... | A01M 23/24 43/85 |
| 1,347,310 A * | 7/1920 | Van Meter | ............ | A01M 23/24 43/81 |
| 1,507,532 A * | 9/1924 | Vickers | ................. | A01M 23/30 43/81 |
| 1,587,536 A * | 6/1926 | Lobit | ..................... | A01M 23/24 43/61 |
| 1,794,463 A * | 3/1931 | Kelp | ...................... | A01M 23/24 43/81 |
| 1,922,265 A * | 8/1933 | Thada | .................... | A01M 23/24 43/83 |
| 2,448,618 A * | 9/1948 | Patrick | .................. | A01M 23/24 43/82 |
| 2,506,055 A * | 5/1950 | Benson | ................. | A01M 23/24 43/85 |
| 3,204,365 A * | 9/1965 | Sartin | ................... | A01M 23/30 43/81 |
| 3,488,878 A * | 1/1970 | Morodomi | ............ | A01M 23/24 43/86 |
| 4,306,370 A * | 12/1981 | Lindblad | ............... | A01M 23/24 43/82 |
| 4,578,893 A * | 4/1986 | Wickenberg | .......... | A01M 23/30 43/77 |
| 4,607,450 A * | 8/1986 | Kaiser | ................... | A01M 23/30 43/83 |
| 4,633,610 A * | 1/1987 | Thompson | ............ | A01M 23/24 43/61 |
| 4,780,984 A * | 11/1988 | Courty | .................. | A01M 23/26 43/82 |

(Continued)

*Primary Examiner* — Christopher P Ellis
(74) *Attorney, Agent, or Firm* — Mark S Hubert

(57) ABSTRACT

A snap style vermin trap disposed on a planar platform having a concave bait box with a vertical trigger. The bait box is centrally located on the front face of the trigger and positioned at a distance above the top face of the platform so as orientate the vermin into a physical posture that greatly enhances the probability of a kill or capture. The trap may be oriented with the platform beneath or above the rapid actuation means of the snap trap and it may use an optional housing to cover the rapid actuation means.

11 Claims, 7 Drawing Sheets

(56) References Cited

U.S. PATENT DOCUMENTS

| | | | | |
|---|---|---|---|---|
| 5,588,249 A * | 12/1996 | Flinner | ............... | A01M 23/20 43/61 |
| 5,706,601 A * | 1/1998 | Dail | ............... | A01M 23/30 43/81 |
| 5,950,354 A * | 9/1999 | Carnwath | ............ | A01M 23/30 43/81 |
| 6,101,761 A * | 8/2000 | Sprick | ............... | A01M 23/265 43/85 |
| 6,990,767 B1 * | 1/2006 | Margalit | ............ | A01M 23/20 43/61 |
| 8,997,696 B1 * | 4/2015 | Wymer | ............... | A01M 29/30 119/712 |
| 9,510,587 B1 * | 12/2016 | Hodel | ............... | A01M 23/30 |
| 9,980,477 B2 | 5/2018 | McGrade | | |
| 2006/0156615 A1 * | 7/2006 | Hale | ............... | A01M 23/30 43/58 |
| 2006/0236590 A1 * | 10/2006 | Hootman | ............ | A01M 23/245 43/92 |
| 2008/0282600 A1 * | 11/2008 | Rich | ............... | A01M 23/24 43/61 |
| 2009/0090043 A1 * | 4/2009 | Desmither | ............ | A01M 23/30 43/81 |
| 2013/0263494 A1 * | 10/2013 | Kay | ............... | A01M 23/00 43/58 |
| 2014/0020278 A1 * | 1/2014 | Smith | ............... | A01M 27/00 43/79 |
| 2018/0228139 A1 * | 8/2018 | Bougie | ............... | A01M 29/30 |
| 2020/0390082 A1 * | 12/2020 | Waiker | ............... | A01M 23/24 |

\* cited by examiner

PRIOR ART

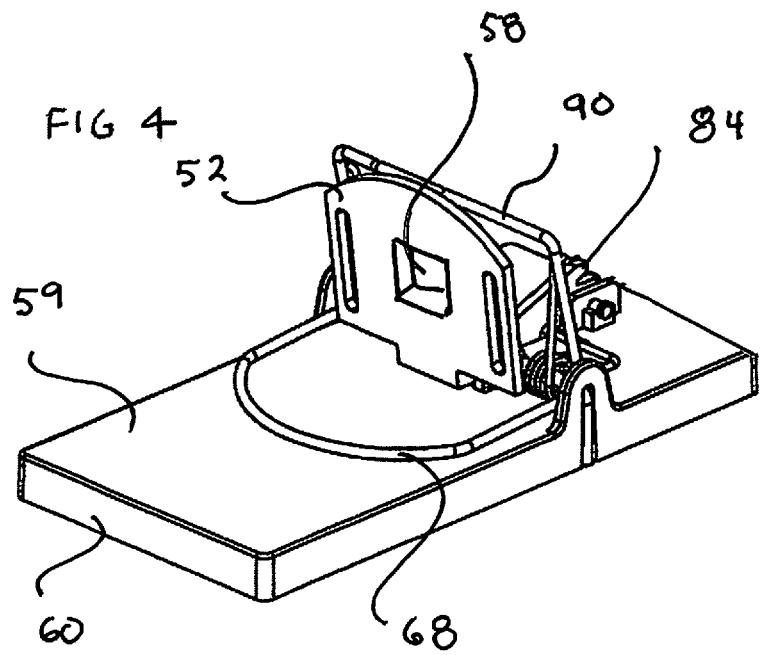
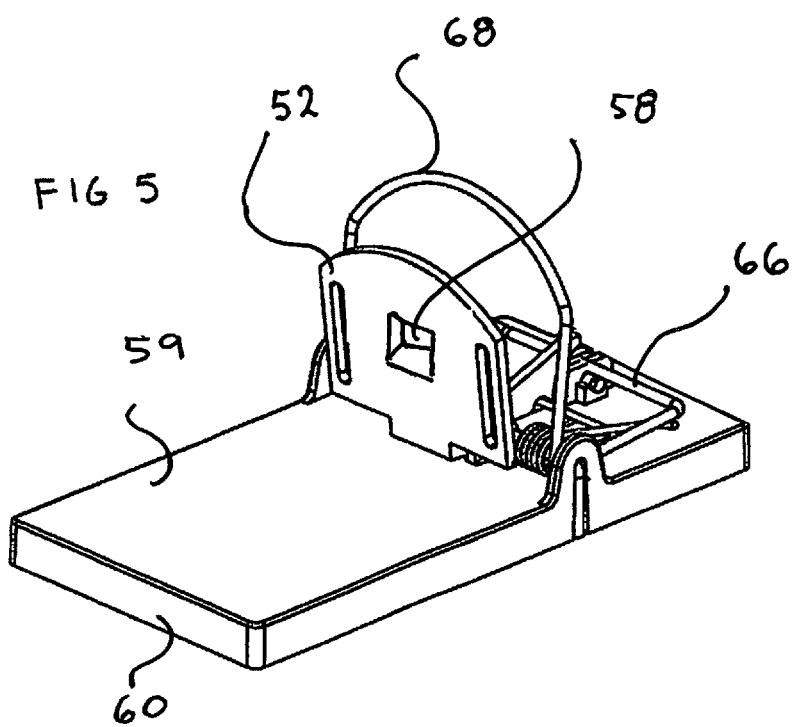

VERTICAL TRAP

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to rodent traps, and more particularly to an improved vertically actuated vermin trap.

BACKGROUND

Trapping vermin such as rodents, moles (rats, mice, chipmunks, squirrels, prairie dogs, etc.) are a function that most people will experience at one time in their life. There is a plethora of methods for eradicating these pests such as trapping, shooting and poisoning. Farmers often maintain cats and dogs just to fulfill this purpose. Despite these radically different approaches, there a few common features that all users want to see in their trapping devices. However, not all devices possess all of these features. Generally, users choose traps that have the features most important to them.

The most sought after features are: ease of setting; cleanliness in handling after a use; ease of extraction of the vermin from the device; ease of baiting; reduced need to rebait; low vermin escape probability; low rate of unproductive, inadvertent device tripping; good aesthetics of device with a captured vermin; and extended durability (able to repeatedly withstand the outside elements for long uses.) The most important feature though, is to have as high a capture/kill ratio per vermin encounter as possible.

It is a long felt need in the industry to provide a single trap that possesses as many of these features as possible. Incorporating more of these features in a single trap will give the consumer a much easier to operate, more efficient, and sanitary trap that is not visually repulsive to one viewing a trapped vermin in the device. Thus, a simpler, cleaner, easier to bait trap with a high kill efficiency is provided by the embodiment set forth below. This new invention utilizes and combines known and new technologies in a unique and novel configuration to overcome the aforementioned problems and accomplish this.

BRIEF SUMMARY

In accordance with various embodiments, a vertical trap with a central bait box incorporated into the trigger for the eradication of vermin is provided.

In one aspect, an open trap that is vertically actuated as the vermin reaches the bait is provided.

Further, a trap that has may optionally have a housing over the trap platform for further trap efficiency. The housing may form a rear chamber behind the trigger, a front chamber in front of the vertical trip plate or a cover chamber and a rear chamber separated by the trigger is provided.

A trap that places the vermin in a physically disadvantaged escape position before its actuation, so as to increase the rate of trapping is provided.

In another aspect, a vertical trap with a bait box integrated into the front or actuation side of the vertical trigger.

In yet another aspect, a vermin trap is provided, capable of aligning the body of the vermin centrally and along the linear axis of the trap.

In a final aspect, an economical, easy to produce vermin trap that can be use repeatedly outdoors without deterioration and is easy to set.

Various modifications and additions can be made to the embodiment discussed without departing from the scope of the invention. For example, while the embodiment described above refer to particular features, the scope of this invention also includes embodiments having different combination of features, more specifically housing configurations, and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 4 is a front perspective view of the improved vertical trap in the armed mode;

FIG. 5 is a front perspective view of the improved vertical trap, in the actuated mode;

DETAILED DESCRIPTION OF CERTAIN EMBODIMENTS

Figure 2:
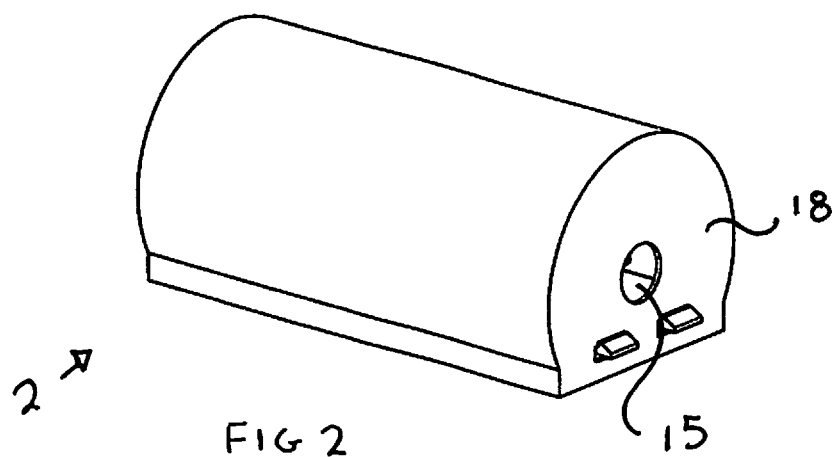
FIG. 2 is a rear perspective view of the prior art vertical trap with a full cover housing installed.

While various aspects and features of the preferred embodiment of the vertical trap have been summarized above, the following detailed description illustrates the preferred embodiment in further detail to enable one skilled in the art to make and use such an embodiment. The described embodiments are provided for illustrative purposes and are not intended to limit the scope of the invention.

In the following description, for the purposes of explanation, numerous specific details are set forth in order to provide a thorough understanding of the described embodiment. It will be apparent to one skilled in the art, however, that other embodiments of the present invention may be made and used without some of these specific details. No single feature or features of the embodiments should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The term "rapid actuation means" as used herein including the claims, is to be interpreted according to 35 USC 112 [para] 6. It refers to a resettable mechanical mechanism that retains and releases stored mechanical energy into the rapid movement of its snap arm when actuated.

As used herein the term "snap trap" or "snap style trap" refers to a design of rapid actuation means mounted on a platform that can propel its snap arm to strike and kill vermin, or retain them there. The rapid actuation means is maintained in a mechanically charged (armed) position by stored mechanical energy (such as a torsion wound spring) that is activated by the application of a small force onto a trigger of the rapid actuation means.

As used herein, the term "trigger" is the pressure or motion sensitive element of a rapid actuation means used to initiate the release of the rapid actuation means stored energy and propel its snap arm at a high velocity.

U.S. Pat. No. 9,980,477 by McGrade teaches a novel design for a vertically actuated "snap style trap" that had a housing over both the front and rear portions of the trap. The housing had dual purposes as it formed an enclosed rear bait chamber behind the vertical snap trap and an anti-escape chamber in front of the vertical snap trap. The trip plate had slots (perforations) formed therethrough for the vermin to smell and see the bait in the rear bait chamber, behind the trip plate. This trap was triggered when the vermin stood on its rear legs and exerted a pressure on its trip plate (which was connected to the means for actuation) in an attempt to get at the bait. Its premise was that the combination of the housing and the vertical design kept the vermin in position that left it less likely to be able to escape the snap arm of an actuated trap. This trap indeed met with great success and greatly increased the efficiency of vermin kills, reducing the vermin escapes and the need to rebait the traps.

Further field testing of this prior art vertical trap revealed two important discoveries. First, the housing did not appreciably raise the efficiency of vermin kills over a vertically actuated trap if the vermin were positioned centrally along the linear axis of the trap and in a vulnerable standing position, prior to actuation. Once the vermin were standing on their two rear legs and centered on the trap platform, their chances of escaping after actuation of the vertical trip plate were less than 3% without the housing. (However, the use of a housing whether over all or only a portion of the platform, does offer other advantages, as will be discussed herein.) Second, placement of the bait up off of the ground and into the center of the trigger, caused the vermin to get onto their rear legs in the center aligned position. Tests show that for an average sized gopher to rear onto its hind legs, the minimum distance from the platform to the bait box is one inch.

For these reasons the improved version of the vertical trap incorporates a central, concave bait box 58 into the front face of the trigger 52 (FIG. 6) that is raised at a vertical distance above the platform (this distance is preferably greater than one inch in height) and only optionally uses a housing. The optional housing may be a full housing 54 that covers the entire trap (first alternate embodiment of FIG. 8), or a half housing 56 that covers the portion of the trap in front or behind the trigger (second alternate embodiment of FIG. 9.)

Figure 1:
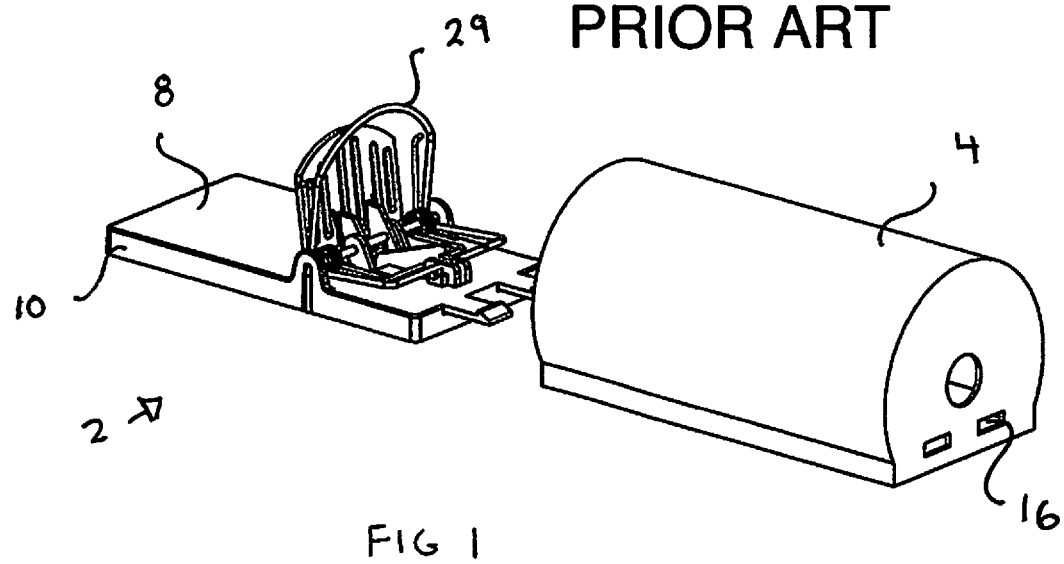
FIG. 1 is a rear perspective view of the prior art vertical trap segregated with its optional detachable full cover housing and base trap components.
Figure 3:
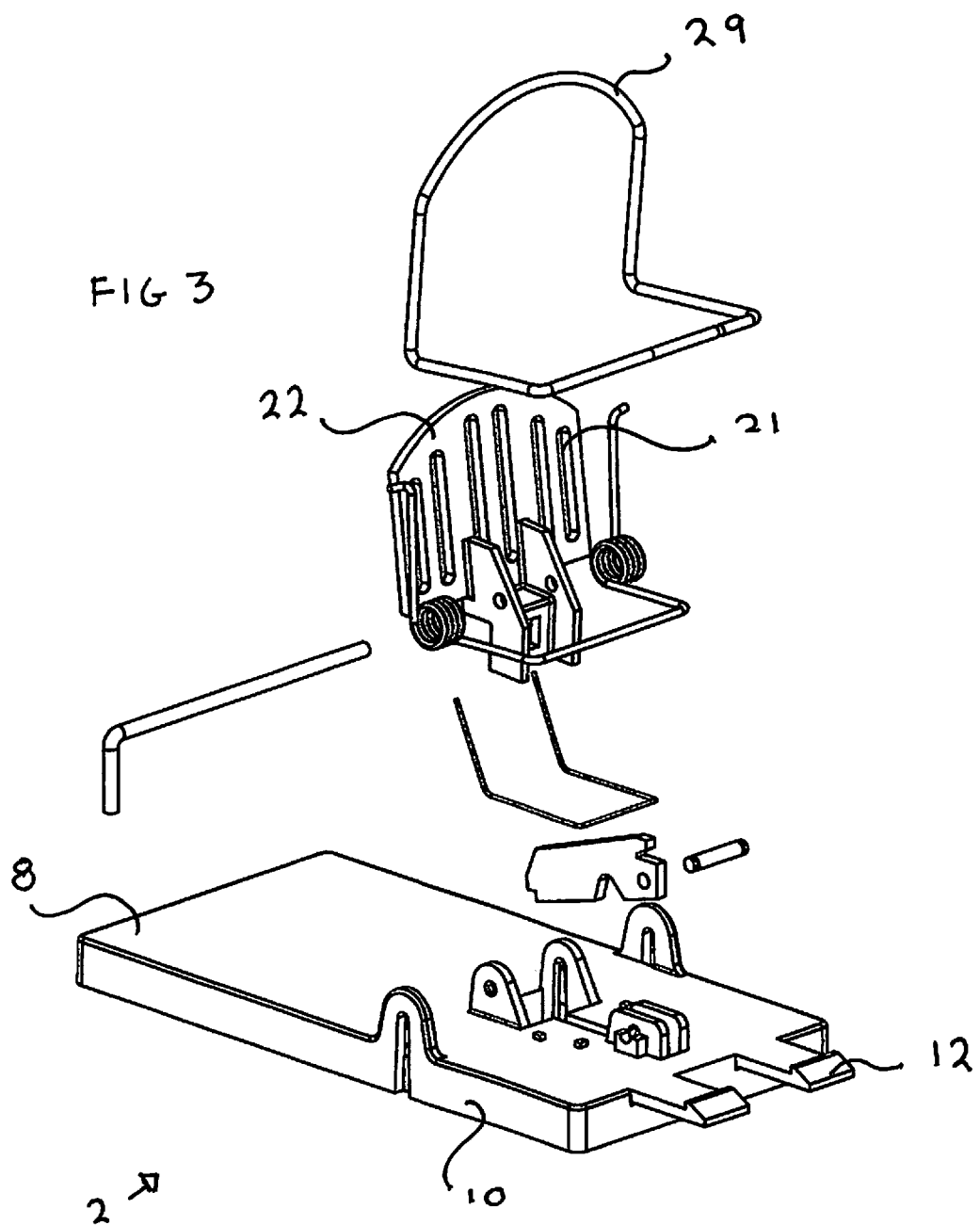
FIG. 3 is a rear exploded perspective view of the prior art vertical trap.

Looking at FIGS. 1 to 3, the prior art vertical snap trap of McGrade (U.S. Pat. No. 9,980,477) can best be explained. FIGS. 1-3 show the trap 2 with its housing on, its housing off and a rear perspective exploded view of the trap 2 without the housing 4.

The prior art vertical trap 2 has a means for actuation mounted on a platform 10 detachable from the housing 4. These two components are momentarily detached and separated for the arming of the means for actuation. The means for actuation has all of its mechanical components affixed to the operational face 8 of the generally planar trap platform 10. The platform 10 has a set of mechanical tabs 12 extending normally from its rear edge 14 that are mechanically engageable with the set of slots 16 cut through the back face of the housing 4.

The concept and basic design of the prior art trap 2 is a partially enclosed snap trap that is segregated into two chambers residing atop of a trap platform 10 that are separated by a perforated, vertical trip plate 22 having a series of orifices 21 formed therethrough so the vermin can see and smell the bait from the front chamber. The two chambers formed when the housing 4 is connected to the platform 10 are the bait chamber behind the trip plate 22 (which houses the bait and the means for actuation), and the actuation chamber ahead of the trip plate 22 (where the vermin enters and activates the trap via the trip plate 22). The bait chamber is enclosed on all sides by the trap platform 10, the vertical trip plate 22 and the inner wall of the housing 4. The actuation chamber has an open front end and is otherwise bounded by the trap platform 10, the vertical trip plate 22 and the inner wall of the housing 4. The vertical trip plate 22 initiates the means for actuation of the trap 2.

The housing 4 (FIGS. 1 and 2) is a hollow cylindrical body open on its front face and having a generally planar rear face 18 residing generally perpendicular to the linear axis of the trap 2. It also has an access port 15 cut through its rear face for both viewing and rebaiting of the trap 2.

The prior art vertical trap shares much of its functional design with that of the improved vertical trap. The snap arm 29 is still actuated in the same way.

While this prior art design works as stated, it fell short of being the perfect vermin trap. Vermin approaching and actuating the trip plate 22 from its left or right side, rather than the middle, especially smaller vermin, have a higher probability of escaping eradication or capture. If the vermin were off to the side of the trap platform there was a good possibility that their tail was curled or out of the path of the snap arm 29. Similarly, vermin that actuate the bottom or a side of trip plate 22 while on all four feet, have the power to jump backwards beyond the housing 4 and escape. It is these off-center activations and non-standing activations that the present improved vertical trap seeks to eliminate.

Figure 6:
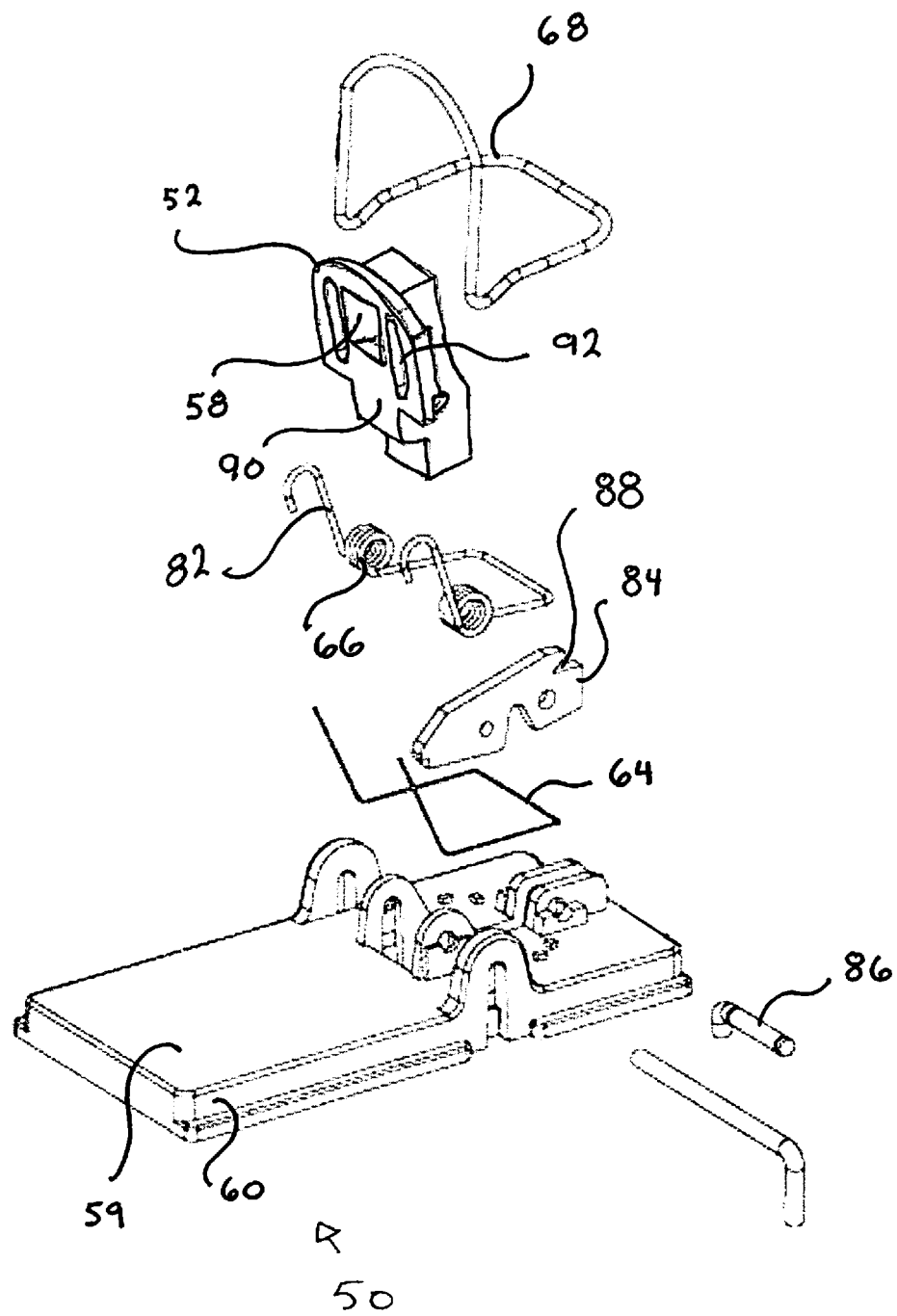
FIG. 6 is a front perspective exploded view of the improved vertical trap.
Figure 7:
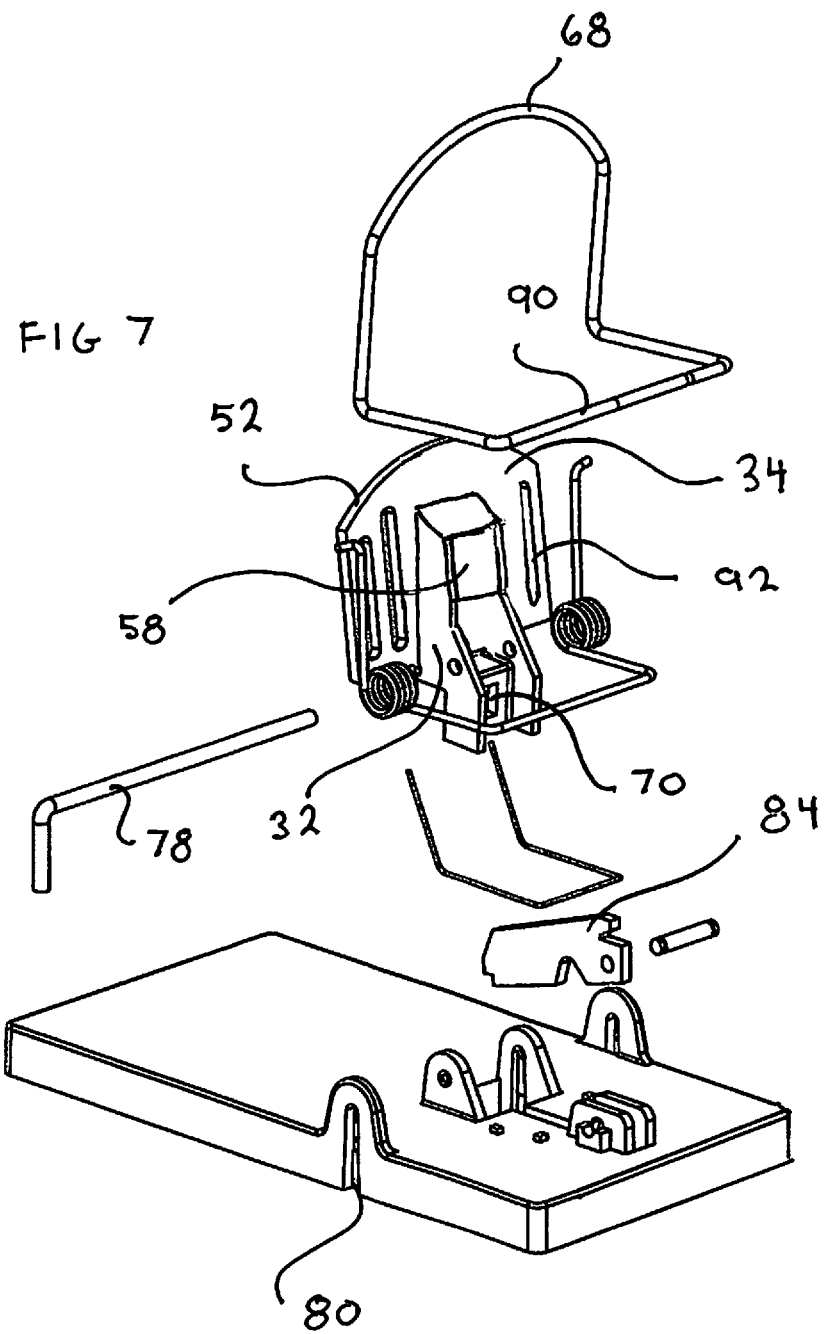
FIG. 7 is a rear perspective exploded view of the improved vertical trap.

Looking at FIGS. 6 and 7 it can be seen that the improved vertical trap 50 has a rapid actuation means with all of its mechanical components affixed to the operational face 59 of the generally planar improved vertical trap platform 60 by a support rod passing through a parallel pair of support plates 72 extending normally from the operational face 59 of the platform 60. (Note in the first alternate embodiment of FIG. 8 the platform 60 has a set of mechanical tabs 62 extending normally from its rear edge that are mechanically engageable with a set of slots formed in the back face of the full housing 54.) In the preferred embodiment shown and discussed herein, the operational face of the trap platform is the top face, however the operational face may be the bottom face of the trap platform in other embodiments wherein the trap is inverted with the platform above the rapid actuation means. This type of orientation is used where the trap platform is tubular and the device is used for insertion into gopher tunnels. The term operational face means the face of the platform to which the rapid actuation means is affixed. It may be the top face or the bottom face of the trap platform.

On the trap platform 60 resides the rapid actuation means which consists of the vertical trigger 52, the forward bias device 64, the stored energy device 66 (a wound torsion spring), a pivotable snap arm 68, a trip arm 84 and trip pin 86. These are operationally connected to the operational face of the platform 50 by a support rod 78 and trip pin 86 respectively passing through orifices in the support plates 72 and the stanchions 88. This rapid actuation means propels its pivotable snap arm 68 at a high rate of speed over the top of its vertical trigger 52 and onto the operational face 59 of the platform 60.

The vertical trigger 52 has a trip arm recess 70 formed to extend from its rear face 34, between two parallel support plates 32 that extend normally from this rear face. The center of the front face 90 of the trigger 52 has a concave bait box 58 formed therein. On either side of the bait box 58 is an optional perforation preferably formed as a slot 92. The two support plates 72 have aligned orifices through which passes a support rod 78, that aligns and retains the rapid actuation means onto the trap platform 60 via its insertion into a slot 80 on the side of the trap platform 60. The trigger 52 may tilt toward the rear or the front of the trap 50, pivoting about the linear axis running through the center of the aligned orifices (and the support member 78.) There are two side arms 82 that extend vertically upward from the torsion spring 66 (which is the stored energy device) and that are connected to the snap arm 68. The torsion spring 66 is positioned around the support member 78. (It is to be noted that the stored energy device is in the charged or armed state in FIGS. 1 and 4. It is in the actuated state in FIG. 5.)

Trip arm 84 has a front and a rear end, with the front end fitting into the trip arm recess 70 of the trigger 52. Extending normally from both sides of the rear end of the trip arm 84 are ends of a pin 86 that rotationally engage a pair of stanchions 88 that extend normally from the operational face 59 of the trap platform 60. This pin 86 allows the pivotal motion of the trip arm 84. The rear end of the trip arm 84 also has a "V" notch 88 formed thereon that is adapted to retain the bottom end 90 of the snap arm 68.

The forward bias device 64 is simply a spring wire mechanism that is affixed to the operational face 59 of the trap platform 60 and braced (under forward pressure) against the back face of the trip plate 84 to maintain the trip plate 88 in a forward position. It is used to help in arming the trap 50.

In operation, the snap arm 68 is pivoted forward such that it rests on the operational face 59 of the trap platform 60 as illustrated in FIG. 4. The back end of the trip arm 84 is not in the trip arm recess. Bait such as peanut butter is forced into the bait box 58. The bottom end of the torsion spring 66 is braced against the operational face 59 of the trap platform 60 and the two side arms 82 (that extend vertically upward from the torsion spring 66) are connected to the pivotable snap arm 68, exerting forward torsional pressure from the stored energy in the torsion spring (stored energy device) attempting to pivot the snap arm 68 over the vertical trigger 52 and down onto the operational face 59 of the trap platform 60.

The snap arm 68 is bent at an acute angle and at its bend, resides below and beneath the support member 78. The rear end 90 of the snap arm 68 is locked (under upward torsional force), into the "V" notch 88 of the trip arm 84. The vertical trigger 52 is tilted such that the front end of the trip arm 84 is inserted into its trip arm recess 70. Now the trip arm 84 resides across the snap arm 68 in a perpendicular fashion. In this configuration, the upward pull from the wound pressure that the torsion spring 66 transfers from its two side arms 82 onto the snap arm 68, places and upward force on the V notch end of the trip arm 84 that pivotally exerts a downward pressure onto the other end of the trigger 52 onto the recess 70, maintaining the vertical trigger 52 in its approximately vertical position and the snap arm 68 poised in its charged position behind the trigger 52. (This is the armed state of the improved vertical trap 50 and the snap arm 68 is positioned as shown in FIGS. 6 and 7.)

Being "armed" means that the torsion spring 66 has its bottom arm in contact with the operational face 59 of the trap platform 60, its side arms 82 connected to the snap arm 68, and the rear end 90 of the snap arm 68 rigidly locked into the "V" notch 88 in the rear end of the trip arm 84 which is inserted into the trip arm recess 70. In this configuration, the snap arm 68 is under considerable torsional pressure urging it to pivot toward the front of the trap 50. It is held from moving under this pressure by the trip arm 84 which is locked into the trip arm recess 70.

When the vermin smells and sees the bait in the bait box 58 it steps onto the platform 60 and approaches the centerline of the trigger 52. It rears up on its hind legs to get up to the bait. It does this directly facing the trigger 52 so that its body and tail lie along the linear axis of the trap platform 60. When it places its front legs on the trigger 52 this forward pressure pushes the top of the pivotable vertical trigger 52 toward the rear of the trap 50 and the bottom of the vertical trigger forward as it pivots about the support member 78. This causes the trip arm recess 70 to move forward enough to allow the rear end of the trip arm 84 to be released and drop down onto the operational face 59 of the trap platform 60 thus allowing the trip arm 84 to pivot about its pin 86 such that the front end of the trip arm 84 is tilted upward letting the rear end 90 of the snap arm 68 be released from the notch 88 in the rear end of the trip arm 84. There is now no longer anything constraining the forward unwinding pressure from the torsion spring 66 and it is free to pivot or swing forward pushing the connected snap arm 68 at a high rate of speed over the top of the vertical trigger 52 and down in an arc onto the strike area of the ooperational face 59 of the trap 60. The vermin is unable to jump forcefully upward on just its two back legs and is struck by the rapidly moving snap arm 68. As an unanticipated advantage of this improved design, when all activation occurs at the center of the trip plate, the vermin are aligned perpendicularly to the snap arm such that their tails lie along the linear axis of the platform. Thus, vermin with smaller bodies that may elude the snap arm, will most certainly have their tail caught by it.

Looking at FIG. 4 it is to be noted that the improved vertical trap 50 shares many of its moving mechanical components (except the housing) with the prior art trap 2, and trigger 52 incorporates a centralized concave bait box that the trip plate of the prior art did not have.

Figure 8:
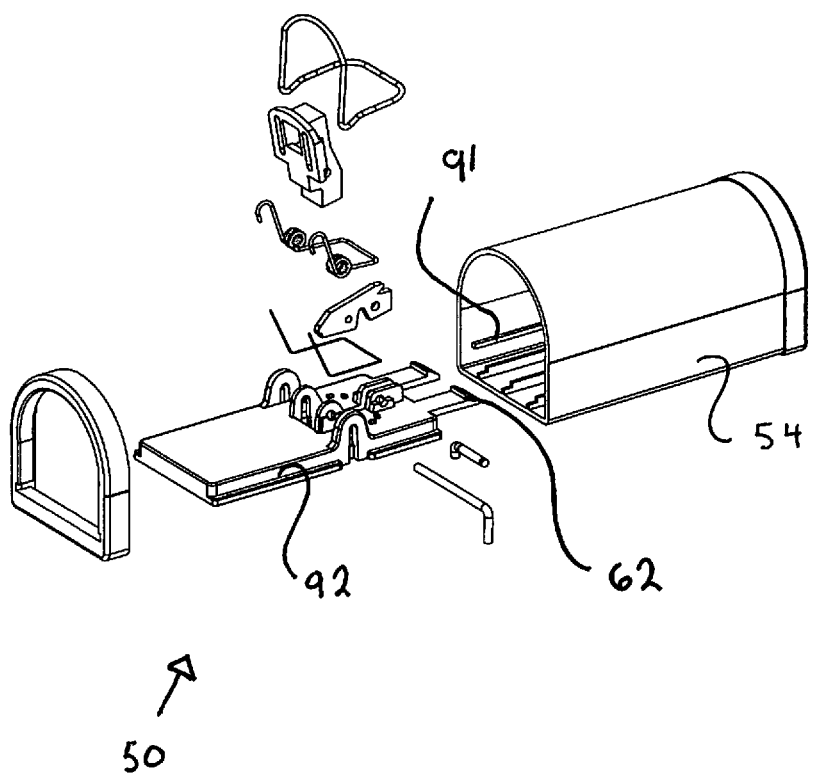
FIG. 8 is a front perspective exploded view of the first alternate embodiment improved vertical trap.
Figure 9:
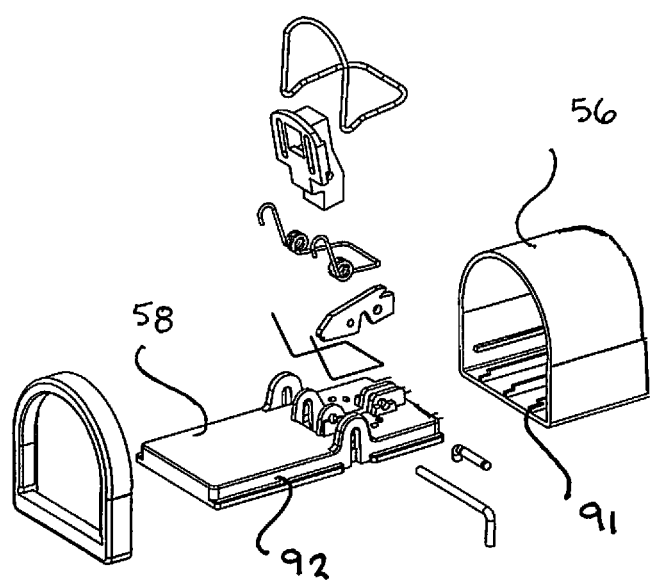
FIG. 9 is a front perspective exploded view of the second alternate embodiment improved vertical trap.

The first and second alternate embodiments are illustrated in FIGS. 8 and 9. Basically, the first embodiment adds a full cover housing 54 over the trap 50 while the second alternate embodiment adds a half cover housing 56 that may optionally be placed in in front of or behind the trigger. The full cover housing 54 is a hollow cylindrical body open on its front face and having a generally planar rear face residing generally perpendicular to the linear axis of the trap 50. The basic configuration of the full cover housing is the same as the housing 4 shown in the prior art of FIG. 2, having an access port 15 cut through its rear face for both viewing and rebaiting of the trap with a backup odoriferous bait (such as blue cheese) to lure the vermin in by smell, as well as two locking tabs 16. The only difference is that the full cover housing 54 has a set of linear guides 91 that matingly engage a linear rabbet 92 formed along the side of the platform 60 and a pair of end rings 94 that frictionally engage the front and back of the full cover housing to the platform 60.

The half cover housing 56 in the second alternate embodiment is open at either end and may optionally be placed in in front of or behind the trigger. Placing it in front helps prevent the rare jumping vermin escape, but more importantly it shields the trapped or killed vermin from view.

This rear chamber, allows the use of a second bait possibly one more odorous, to lure in the vermin. Also, where the bait in the centralized bait box was removed bit by bit by ants, a second, bigger bait may still maintain the allure of the trap.

The improved vertical trap with its centralized, raised bait box located on the trigger, ensures that the vermin are both centered on the platform with their tail in a straight line along the linear axis of the trap platform, and are standing on only their rear two legs when they actuate the device. Thus, they are positioned in the best location for eradication. They have the furthest to jump to avoid the snap arm, they only have two legs to jump with, and smaller vermin have their tail at the optimal location to trap if they avoid being struck with the snap arm. This improved design of a centralized concave bait box on the trigger had the unexpected result of allowing the elimination of the housing while increasing the kill to actuation ratio.

While certain features and aspects have been described with respect to exemplary embodiments, one skilled in the art will recognize that numerous modifications are possible. Other alternate embodiments exist that invert the trap 50 still leaving the trigger in a vertical orientation, but where the trap platform resides above the rapid actuation means. Here the trap platform need not be planar but rather it can be tubular so as to be able to be placed into a gopher tunnel. An image of this would be the inversion of FIG. 8.

System components described according to a particular structural architecture and/or with respect to one system may be organized in alternative structural architectures and/or incorporated within other described systems. Hence, the various components and/or features described herein can be substituted, added, and/or subtracted from unless the context dictates otherwise. Consequently, although only one exemplary embodiment is described above, it will be appreciated that the invention is intended to cover all modifications and equivalents within the scope of the following claims.

Having thus described the invention, what is claimed as new and desired to be secured by Letters Patent is as follows:

1. An improved vertical vermin trap comprising:
    a trap platform, said trap platform having an operational face;
    a rapid actuation means with a vertical trigger, said rapid actuation means affixed onto said operational face;
    wherein said rapid actuation means has a stored energy device connected to a pivotable snap arm propellable at a high rate of speed onto said operational face after the application of a pressure onto said vertical trigger; and
    wherein said vertical trigger has a front face and a back face, said front face having a centrally located concave bait box raised at a distance from said operational face.

2. The improved vermin trap of claim 1 further comprising:
    a housing affixed to said trap platform, said rapid actuation means residing between said housing and said trap platform.

3. The improved vermin trap of claim 2 wherein said trigger is perforated.

4. The improved vermin trap of claim 2 wherein said stored energy device is a torsional spring.

5. The improved vermin trap of claim 1 further comprising;
    a pivotable trip arm with a first orifice therethrough;
    a least one stanchion with a second orifice formed therethrough, said stanchion extending normally from said operational face; and
    a trip pin residing through said first orifice and said second orifice and pivotally connecting said trip arm to said at least one stanchion.

6. The improved vermin trap of claim 5 wherein said trip arm has a front end and a rear end, said front end releaseably engageable in a trip arm recess in said back face of said trigger, and said rear end having a notch formed therein, said notch releaseably retaining said snap arm.

7. The improved vermin trap of claim 6 wherein upon an application of pressure on said front face of said vertical trigger, said vertical trigger pivots to release said front end of said trip arm which pivots about said trip pin releasing said snap arm which is releaseably housed in said notch.

8. The improved vermin trap of claim 1 wherein said operational face resides in an upward facing direction.

9. The improved vermin trap of claim 1 wherein said operational face resides in a downward facing direction.

10. The improved vermin trap of claim 2 wherein said operational face resides in a downward facing direction.

11. The improved vermin trap of claim 1 wherein said distance between said trap platform and said concave bait box is a minimum of 1 inch.

\* \* \* \* \*